(12) United States Patent
Arnason

(10) Patent No.: US 6,235,332 B1
(45) Date of Patent: May 22, 2001

(54) METHOD OF INCREASING EFFICIENCY IN THE FREEZING OF INDIVIDUAL ITEMS OF FOOD IN A FREEZING TUNNEL

(76) Inventor: Ingolfur Arnason, Soleyjargotu 14, 300, Akranes (IS)

( * ) Notice: Subject to any disclaimer, the term of this patent is extended or adjusted under 35 U.S.C. 154(b) by 0 days.

(21) Appl. No.: 09/462,424

(22) PCT Filed: Jul. 10, 1998

(86) PCT No.: PCT/IS98/00007

§ 371 Date: Mar. 9, 2000

§ 102(e) Date: Mar. 9, 2000

(87) PCT Pub. No.: WO99/02932

PCT Pub. Date: Jan. 21, 1999

(30) Foreign Application Priority Data

Jul. 11, 1997 (IS) .......................................... 4522

(51) Int. Cl.[7] .................................................. F25D 25/00
(52) U.S. Cl. ................................ 426/524; 62/63; 62/374; 62/380
(58) Field of Search ..................... 426/524; 62/62, 62/63, 374, 380

(56) References Cited

U.S. PATENT DOCUMENTS 3,402,568 * 9/1968 Kamin et al. .......................... 62/380
3,708,995 * 1/1973 Berg ......................................... 62/63

* cited by examiner

Primary Examiner—George C. Yeung
(74) Attorney, Agent, or Firm—Finnegan, Henderson, Farabow, Garrett & Dunner, L.L.P.

(57) ABSTRACT

A method for increasing efficiency in the freezing of delicate items of food in freezing tunnels of the conventional type, including a freezing tunnel (8) having a device (6 and 7) for providing a strongly cooled flow of air to act as a freezing agent, at least two or more endless freezing conveyor belts (2, 3, 4) and (5) supported therein, a movable feeding conveyor (1) and a transfer conveyor (9), where the items of food do not tolerate being dropped from the upper freezing conveyors (2, 3, 4) onto the bottom freezing conveyor (5) until they have gained sufficient stiffness to preserve a nondeformable shape; the method including placing delicate items of food on the upper freezing conveyors (2, 3, 4), one at a time by a moveable feeding conveyor (1), where the upper freezing conveyors are stopped in a fixed sequence.

6 Claims, 1 Drawing Sheet

METHOD OF INCREASING EFFICIENCY IN THE FREEZING OF INDIVIDUAL ITEMS OF FOOD IN A FREEZING TUNNEL

TECHNICAL FIELD

The invention relates to an improved method for food freezing of delicate items of food in a strongly cooled flow of air through a freezing tunnel on board ships and on land in the processing of delicate products. More particularly, the present invention relates to a method for freezing delicate items of food in a freezing tunnel comprising a freezing tunnel having means for providing a strongly cooled flow of air to act as a freezing agent, at least two or more endless conveyor belts supported therein, a movable feeding conveyor and a transfer conveyor, where said items of food do not tolerate being dropped between the freezing conveyors until they have gained sufficient frozen stiffness to preserve their undeformed shape; the said method consisting of placing the said delicate items of food on the freezing conveyors for being conveyed through the freezing tunnel for a sufficient freezing dwell time in the freezing tunnel for the particular foodstuff being fully frozen; gaining that by having one or more of the freezing conveyors stopping in a fixed sequence. By increasing the number of conveyors that are stopped in a fixed sequence it is possible to increase the efficiency of the freezer beyond that of conventional ones.

BACKGROUND ART

By using conventional methods the products to be frozen in a conventional freezing tunnel, having at least two or more freezing conveyors supported therein, are fed onto the top freezing conveyor which conveys the products through the freezing tunnel in a continuous movement. On this freezing conveyor only the surface of the products gets to be frozen. The products, though, hardly become firm enough in shape to be moved undeformed onto the next freezing conveyor where the item is fully frozen. Finally the product is delivered from the end of the last freezing conveyor for further processing.

A U.S. Pat. No. 3,708,995 describes a freezing tunnel of the above-mentioned conventional type with a multiple run conveyor, which is formed by three layers of endless conveyor belt, where each conveyor belt moves in the opposite direction compared to the conveyor belt next in row below. In said freezing tunnel the products to be frozen are dropped from the one freezing conveyor belt to the other. The total dwell-time of the products in the freezing tunnel increases with the number of freezing conveyors used and thereby the efficiency per area occupied by the freezing tunnel in the field of general freezing of foodstuff.

The most important factor that limits the efficiency of conventional freezing tunnels in the field of freezing delicate individual items of food, where appearance and shape of the product is important, is the length of time the individual items can dwell in the tunnel free of each other, exposed to the cold flow of air that freezes them without being subjected to any handling that will deform them.

In conventional freezing tunnels such as the one described in U.S. Pat. No. 3,708,995 the time it takes for the products to gain their frozen shape and become sufficiently firm to allow their transfer without damaging their form between the top freezing conveyor and lower freezing conveyors is limited by the area and speed of the top freezing conveyor.

Thus, the main factors that can be utilized to control the surface freezing dwell time of the product on the top freezing conveyor for safe transfer between the freezing conveyors are the size and speed of the top freezing conveyor belt.

Therefore, when the efficiency of the conventional freezing tunnel is under consideration concerning the quick freezing of delicate foodstuff, the actual number of freezing conveyors is irrelevant if the product can not be transferred undamaged and undeformed between the conveyors since it is the surface freezing dwell time of the product on the first conveyor which matters.

Thus it is the area and the speed of the first and topmost freezing conveyor belt which determines the efficiency of conventional freezing tunnels in the field of freezing of delicate products.

For example, a fish fillet to be frozen in a freezing tunnel will need a certain freezing dwell time to reach the firmness needed to stand the handling that accompanies being moved between freezing conveyors. If the fillet is not sufficiently firm in shape to be moved between the conveyors its shape will be altered and deformed when moved between the conveyors in a conventional freezing tunnel. The fillet will therefore take on a deformed shape in its fully frozen condition on the lower freezing conveyors and—thereby, as a sales product—become unsuitable merchandise according to the demands made in the market for frozen fish fillets.

For these reasons conventional tunnel freezers can take up a lot of space, depending on the desired size of the topmost freezing conveyor belt. That can become a major problem when it comes to tunnel freezing delicate products on board ships or in a factory where available space is limited and of the utmost importance for a producer who wants to achieve acceptable productivity.

The extreme cost of building and running large tunnel freezing rooms is considerable and can be decisive in the feasibility of using tunnel freezing as a production method, and the profit achieved by the added value gained by this method of freezing delicate individual items of food can be lost.

DISCLOSURE OF THE INVENTION

The method for freezing of delicate items of food of the present invention, is characterized by feeding, by means of the movable feeding conveyor, the upper freezing conveyors, which all rotate in the same direction, in a fixed sequence, where the first one of the said freezing conveyors to be fed stops when its surface area has been fully covered with the products to be frozen and the feeding conveyor moves by a controlling device to the next one in the sequence of the said freezing conveyors, which starts running thereby until its surface area has been fully covered with the products to be frozen, whereby it stops and the feeding conveyor moves over to the third one in the sequence of the said freezing conveyors, which starts running thereby until its surface area has been fully covered with the products to be frozen, whereby it stops, while in the meantime the two of the said freezing conveyors which were fed first in the sequence have stayed at a standstill, whereby the delicate products on the first freezing conveyor belt have had enough freezing dwell time during said standstill for them to gain their frozen shape and sufficient stiffness before being dropped without being deformed or damaged onto the bottom freezing conveyor belt, which runs at such a speed in the opposite direction compared to the upper conveyors that thereby, on said conveyor, the said products freeze completely through on their way out of the freezing tunnel for further processing.

The method is particularly suitable for freezing delicate products which cannot be moved between freezing conveyors without altering their shape and form, thus being damaged when moved between the freezing conveyors and becoming unsuitable as a viable product.

By this method the time for freezing through the surface of delicate products is multiplied, depending on the number of freezing conveyors used, when tunnel freezing products which cannot be moved between conveyors without damage to said products.

By this method efficiency is increased compared to freezing tunnels as well as the freezer described in U.S. Pat. No. 3,708,995.

BRIEF DESCRIPTION OF THE DRAWING

The present invention will now be briefly described with reference to the accompanying drawing, in which.

BEST MODE FOR CARRYING OUT THE INVENTION

Figure 1:
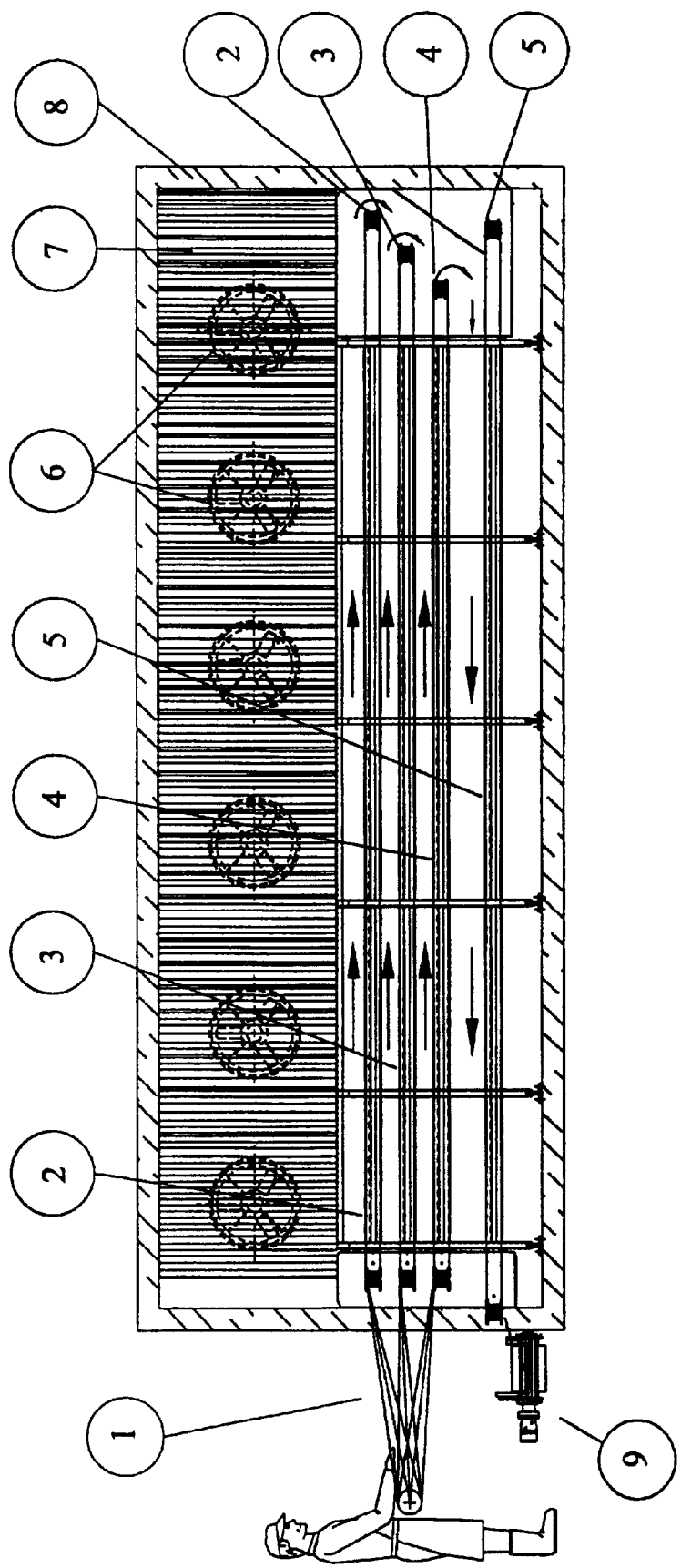
FIG. 1 shows a side view of a freezing tunnel which is, in its general construction, based on the conventional type of a freezing tunnel, comprising insulated freezing tunnel (8) with fans (6) that circulate cold air inside the freezing tunnel (8) in heat exchange relationship with the product to be frozen; condensers (7) with refrigerating agent inside them, where the circulating air cools down again in heat exchange relationship with the refrigerating agent through the condenser's tube walls, and thereby loses its warmth which it removed from the product; three upper freezing conveyors (2), (3) and (4) and a bottom freezing conveyor (5), all with endless belts; a movable feeding conveyor (1) and a transfer conveyor (9), also with endless belts.

Referring to FIG. 1, the best mode for carrying out the present invention includes the following steps, which form a first sequence:

Delicate products to be frozen are placed on the movable feeding conveyor (1), which in its highest position, is able to feed the product onto the top freezing conveyor (2) at the inlet end of the tunnel freezer (8). The top freezing conveyor (2) moves the product towards the right hand end of the tunnel and stops when the first products fed onto it have reached the end of the upper run of the conveyor and its surface area has been filled and covered with products in such a way that each of the delicate items of food is sufficiently exposed to the cold flow of air to be able to gain their desired freezing stiffness at this stage as quickly as possible.

When freezing conveyor (2) stops, the feeding conveyor (1) receives a signal and moves over to its middle position, whereby it is able to feed products onto the intermediate freezing conveyor belt (3), which starts running thereby. The freezing conveyor (3) then moves the products towards the right hand end of the tunnel and stops when the first products fed onto it have reached the end of the upper run of the conveyor and its surface area has been filled and covered with products to be frozen in the same way as the top freezing conveyor (2). The freezing conveyors (2) and (3) stay at a standstill.

When freezing conveyor (3) stops, the feeding conveyor (1) receives a signal and moves over to its lowest position, whereby it is able to feed products onto the lowest freezing conveyor belt (4) of the three upper freezing conveyors, which starts running thereby. The freezing conveyor (4) then moves the products towards the right hand end of the tunnel and stops when the first products fed onto it have reached the end of the upper run of the conveyor and its surface area has been filled and covered with products to be frozen the same way as in the two previous cases. The three freezing conveyors (2), (3) and (4) now stay at a standstill.

When freezing conveyor (4) stops, the feeding conveyor (1) receives a signal and moves again over to its highest position, whereby it is now able to begin to feed products again onto the top freezing conveyor belt (2), which was first fed in the sequence. Thereby the freezing conveyor (2) starts running again and is being refilled with new delicate products at the same time as it starts to deliver the products, being first fed onto it, onto the bottom freezing conveyor (5) for being fully frozen thereon and being moved out of the freezing tunnel. During the standstill of the top freezing conveyor belt (2), the delicate items of foodstuff being first fed onto it, have had enough freezing dwell time thereon to gain their frozen shape and sufficient stiffness to be able to endure being dropped without being deformed or damaged onto the bottom freezing conveyor belt (5). Thereby ends the first sequence and a new one begins.

The top freezing conveyor belt (2) stops again when its surface area has been fully covered as before, the feeding conveyor (1) then receives a signal and moves thereby again to its middle position, whereby it is able to refill the intermediate freezing conveyor belt (3) with delicate products to be frozen, which starts running thereby and delivers the products, which were first fed onto it, frozen through the surface onto the bottom freezing conveyor (5), and then the same procedure goes for the lowest freezing conveyor (4).

Thus the sequence is repeated over and over again, where freezing conveyors (2), (3) and (4) are fed one at a time while the other freezing conveyors that are not being fed are stopped.

The bottom freezing conveyor (5), which runs nonstop at a desired speed in the opposite direction compared to all the upper freezing conveyors, receives products frozen into desired shape from the said upper conveyors and on the said conveyor (5) the products get enough freezing dwell time to freeze completely through on their way out of the freezing tunnel, where the products are being delivered on a transferring conveyor (9) for further processing outside the tunnel freezer.

The upper freezing conveyors have their length formed in such a way that the lowest conveyor (4) is shorter than the intermediate conveyor (3), which again is shorter than the uppermost conveyor belt (2), which thereby is the longest of all three conveyors. By such a construction of the upper freezing conveyors it does not matter in which sequence they deliver the sufficiently surface frozen products onto the bottom conveyor (5), the products can be dropped free of the conveyors at a standstill below.

INDUSTRIAL APPLICABILITY

The main industrial applicability of the present invention takes place in the field of freezing delicate individual items of food in tunnel freezers in factories on land and on board ships where available space for such tunnel freezers is limited.

The essential difference between the use of the method described above and known tunnel freezers is that this method allows freezing of delicate products with many freezing conveyors, thus multiplying the time for surface freezing so that the products reach the state of firmness necessary in order to be moved on between conveyors. Thus efficiency of tunnel freezing with this method increases per unit of space available on ships and in factories on land.

What is chiefly gained by this method is the possibility of freezing delicate products that are not suitable for conventional tunnel freezers. The products are placed on a firm surface that does not change its shape during the freezing process as the freezing conveyors do not move while the surface of the products is frozen through, thus giving the products sufficient firmness to stand transfer between freezing conveyors.

The chief gain in using the method described above is the solution of the problem encountered in conventional tunnel freezers as well as the freezer described in U.S. Pat. No. 3,708,995 in the freezing of delicate products that are not frozen solidly enough on the surface to stand being moved between freezing conveyors.

Thereby it is possible to achieve increased efficiency as compared to conventional tunnel freezers as well as the freezer described in U.S. Pat. No. 3,708,995 in a tunnel freezer with multiple freezing conveyors for the freezing of delicate products that do not tolerate rough handling.

The method described here is not limited by a certain number of freezing conveyors in a freezing tunnel as the number of freezing conveyors is only limited by height of ceiling and factory space available.

By reducing the space needed for a freezing tunnel such equipment is easier to accommodate on board ships and on land and therefore the possibilities of finding practical/economical solutions of processing in freezing tunnels are greatly increased.

The invention described here is not limited to the types described above as it can be developed in various ways. For example the length of the freezing conveyors can be varied with regard to space and the number of freezing conveyors may be varied in accordance with space available and desired capacity.

What is claimed is:

1. A method of freezing food products by conveyance through a freezing chamber provided with a cooled air flow, the method comprising:

arranging the food products on each of a first set of longitudinally arranged freezing conveyors located in the freezing chamber;

conveying the products in a first direction along the first set of freezing conveyors, the freezing conveyors being so arranged to allow a controlled flow of air to be directed to the products;

controlling the first set of freezing conveyors so that the products on each of the first set of freezing conveyors are alternately moved and stopped to ensure that the products are frozen stiff and attain a non-deformable shape while the products remain on each of the first set of freezing conveyors;

transferring the frozen stiff and non-deformable products to a longitudinally arranged discharge conveyor in the chamber under the first set of freezing conveyors;

conveying the products on the discharge conveyor in a second direction opposite to the first direction for further complete freezing of the products prior to discharge from the freezing chamber.

2. The method of claim 1, wherein the first set of freezing conveyors includes at least first and second conveyors arranged one above the other, and further comprising:

loading the products onto the first conveyor while the products thereon are being conveyed though the chamber in the first direction;

stopping conveyance of the products on the first conveyor when the loaded products extend for the length of the first conveyor;

loading the products onto the second conveyor while the products thereon are being conveyed though the chamber in the first direction and while the first conveyor remains stopped;

stopping conveyance of the products on the second conveyor when the loaded products extend for the length of the second conveyor; and resuming conveyance of the products on the first conveyor to transfer the frozen stiff and non-deformable products from the first conveyor to the discharge conveyor while loading additional products onto the first conveyor and while the second conveyor remains stopped.

3. The method of claim 2, wherein the discharge conveyor is operated continuously in the second direction while receiving the frozen stiff and non-deformable products alternately from the at least first and second conveyors of the first set of freezing conveyors, and for discharging completely frozen products to a transfer conveyor for further processing outside the freezing chamber.

4. The method of any one of claims 1–3, wherein the food products to be frozen are fish fillets.

5. The method of any one of claims 1–3, wherein food products to be frozen are shrimps.

6. The method of any one of claims 2 or 3, wherein the first set of freezing conveyors includes at least a third conveyor for operation alternately with the first and second conveyors.

* * * * *